US006980946B2

(12) United States Patent
Giles et al.

(10) Patent No.: US 6,980,946 B2
(45) Date of Patent: Dec. 27, 2005

(54) METHOD FOR HYBRID PROCESSING OF SOFTWARE INSTRUCTIONS OF AN EMULATED COMPUTER SYSTEM

(75) Inventors: Aaron Giles, Sunnyvale, CA (US); Eric P. Traut, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 09/809,731

(22) Filed: Mar. 15, 2001

(65) Prior Publication Data

US 2002/0133810 A1   Sep. 19, 2002

(51) Int. Cl.[7] ............................. G06F 9/45; G06F 12/00
(52) U.S. Cl. ......................... 703/22; 711/203; 711/206
(58) Field of Search ......................... 703/22; 711/203, 711/206, 208–209; 395/500

(56) References Cited

U.S. PATENT DOCUMENTS

| | | | |
|---|---|---|---|
| 4,779,188 A | 10/1988 | Gum et al. ................. 364/200 |
| 4,875,186 A | 10/1989 | Blume, Jr. .................. 364/900 |
| 5,278,973 A | 1/1994 | O'Brien et al. ............. 395/500 |
| 5,301,277 A | 4/1994 | Kanai ......................... 709/301 |
| 5,367,628 A | 11/1994 | Ote et al. .................... 345/501 |
| 5,406,644 A | 4/1995 | MacGregor ................. 395/500 |
| 5,448,264 A | 9/1995 | Pinedo et al. ............... 345/508 |
| 5,452,456 A | 9/1995 | Mourey et al. ............. 713/100 |
| 5,502,809 A | 3/1996 | Takano ........................ 345/509 |
| 5,640,562 A | 6/1997 | Wold et al. .................. 395/652 |
| 5,666,521 A | 9/1997 | Marisetty ..................... 345/525 |
| 5,742,797 A | 4/1998 | Celi, Jr. et al. ............. 345/507 |
| 5,752,275 A | 5/1998 | Hammond .................. 711/207 |
| 5,757,386 A | 5/1998 | Celi, Jr. et al. ............. 345/507 |
| 5,790,825 A | 8/1998 | Traut .......................... 712/209 |
| 5,812,823 A * | 9/1998 | Kahle et al. ................. 703/26 |
| 5,815,686 A * | 9/1998 | Earl et al. .................... 703/26 |
| 5,831,607 A | 11/1998 | Brooks ........................ 345/333 |
| 5,860,147 A | 1/1999 | Gochman et al. ........... 711/207 |
| 5,940,872 A | 8/1999 | Hammond et al. ......... 711/207 |
| 6,014,170 A | 1/2000 | Pont et al. ................... 348/232 |
| 6,026,476 A | 2/2000 | Rosen ......................... 711/206 |
| 6,067,618 A | 5/2000 | Weber .......................... 713/1 |
| 6,651,132 B1 * | 11/2003 | Traut ............................ 711/6 |

FOREIGN PATENT DOCUMENTS

EP           0 524 773 A1     7/1992     ............. G06F 9/44

(Continued)

OTHER PUBLICATIONS

"Processor Instruction Sets," The PC Guide, version date Dec. 18, 2000, http://www.pcguide.com/ref/cpu/arch/int/inst-c.html.

(Continued)

Primary Examiner—Hugh Jones
(74) Attorney, Agent, or Firm—Woodcock Washburn LLP (57) ABSTRACT

A method for processing software instructions in an emulated computing environment is provided in which instruction blocks from the application programs of a guest computer system are parsed to determine whether the instruction blocks include instructions executable at user level or supervisor level. Those instruction blocks that are executable at user level are passed directly to the processor of the host computer system, and those instruction blocks that are executable at supervisor level, are translated before being passed to the processor for execution. In the case of instruction blocks that include instruction blocks executable at supervisor level, prior to translation, a cache is queried to determine whether a translation for the instruction block is in the case. If a translation is in the cache, the translated version in the cache is provided to the processor for execution. If a translation is not in the cache, translation occurs, and the translated instruction block is saved to the cache.

20 Claims, 7 Drawing Sheets

FOREIGN PATENT DOCUMENTS

| | | | | |
|---|---|---|---|---|
| EP | 0 645 701 A2 | 9/1994 | ............ | G06F 9/455 |
| WO | WO 98/57262 | 12/1998 | ............ | G06F 9/455 |

OTHER PUBLICATIONS

"M68060 User's Manual," Motorola, 1994, pp. i-xviii; Section 4, Memory Management Unit, pp. 4-1 to 4-30, http://e-www.motorola.com/brdata/PDFDB/MICROPROCESSORS/32_BIT/68K-COLDFIRE/M680X0/MC68060UM.pdf.

"MPC750, RISC Microprocessor User's Manual," Motorola, Aug. 1997, Contents, pp. iii-xvi; Chapter 5, Memory Management, pp. 5-1 to 5-34; Glossary, pp. Glossary-1 to Glossary-13, http://e-www.motorola.com/brdata/PDFDB/MICROPROCESSORS/32_BIT/POWERPC/MPC7XX/MPC750UM.pdf.

PCT International Search Report in International Applicatio No. PCT/US 01/22277, International filing date Jul. 16, 2001, mail date Feb. 7, 2002.

PCT International Search Report in International Application No. PCT/US 01/22276, International filing date Jul. 16, 2001, mail date Jul. 3, 2002.

Traut E, "Building the Virtual PC," *Byte*, McGraw-Hill Inc., vol. 22, No. 11, pp. 51-52, Nov. 1, 1997.

"Intel386 DX Microprocessor," *Intel*, pp. 32-58, Dec. 31, 1995.

"MacIntosh and Technology: Changing Chips in the Middle of the Stream, or Apple Takes a Risc," URL:www.btech.co/changingchips.html, paragraphs '00061 -'00071 , retrieved Dec. 10, 2001.

"M68040 User's Manual, " Motorola, Inc., Chapter 3, copyright 1990, revised 1992, 1993.

Osisek DL et al., "ESA/390 Interpretive-Execution Architecture, Foundation for VM/ESA," *IBM Systems Journal*, vol. 30, No. 1, pp. 34-51, 1991.

Shang Rong Tsai et al., On the Architectural Support for Logical Machine Systems, *Microprocessing and Microprogramming*, vol. 22, No. 2, pp. 81-96, Feb. 1988.

U.S. Appl. No. 09/617,709, "System and Method for Emulating the Operation of a Translation Look-Aside Buffer", Traut, filed Jul. 17, 2000.

U.S. Appl. No. 09/617,669, "System and Method for Displaying Current Images of Virtual Machine Environments", Traut, et al., filed Jul. 17, 2000.

U.S. Appl. No. 09/617,624, "System and Method for Emulating the Operation of a Video Graphics Adapter", Carroll, et al., filed Jul. 17, 2000.

U.S. Appl. No. 09/747,492, "System and Method for the Logical Substitution of Processor Control in an Emulated Computing Environment", Traut, filed Dec. 21, 2000.

* cited by examiner

METHOD FOR HYBRID PROCESSING OF SOFTWARE INSTRUCTIONS OF AN EMULATED COMPUTER SYSTEM

CROSS-REFERENCE TO RELATED APPLICATIONS

The present application is related by subject matter to U.S. application Ser. No. 09/747,492, "System and Method for the Logical Substitution of Processor Control in an Emulated Computing Environment," which is incorporated herein by reference.

BACKGROUND OF THE INVENTION

The present invention relates in general to the field of computer system emulation and, more particularly, to a system and method for the handling of software instructions directed to the processor of the computer system from an emulated computer system.

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software designed for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system exists as a virtual machine, as the guest computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

The emulation program may reside as an application program that runs on the host operating system. The emulation program will in turn emulate the operation of the guest computer system. If the host computer system and the guest computer system are designed to operate on two different microprocessor families, the emulator program must translate instructions intended to be executed by the guest microprocessor family into instructions that can be executed by the processor of the host computer system. In doing so, the emulator program dynamically translates blocks or groups of instructions destined for the microprocessor family of the emulated computer system to a set of instructions that are executable, following compilation if necessary, by the processor of the host computer system.

As the software or hardware of a computer system improves over time to accommodate technological or design advances, it is desirable that backward compatibility be provided for legacy software written for prior versions of the software or hardware of the computer system. One example of backward compatibility involves emulation programs that emulate a DOS environment. An emulation program running as an application in a Windows operating system can emulate a DOS environment, allowing application programs written for DOS to execute. The DOS-based application program executes as though the DOS operating system is in logical control of the computer system, when in fact Windows or some other host operating system is in logical control of the operating system. In this example, because the processor associated with the Windows host operating system and the processor associated with the DOS operating system are in the same processor family, the code associated with application programs written for the DOS operating system can be run directly on the processor of the computer system. Emulation is desirable in this example because the DOS operating system expects to be in logical control of the hardware of the computer system. By emulating the DOS operating system in the host operating system, the DOS code can execute on the computer system without the necessity of forcing the Windows operating system to give up logical control of the computer system. Windows remains in logical control of the operating system, permitting all Windows-based functionality, including all I/O functionality, of the computer system to continue to function.

Typically, a modem processor will include two operating modes: user level and supervisor level. When the processor is at supervisor level, the processor can execute every instruction in the processor's instruction set. When the processor is operating at user level, the processor can execute only a subset of the instructions of the instruction set. Most of the instructions in the processor instruction set are executable irrespective of whether the processor is operating at user level or supervisor level. There are a limited set of instructions that cannot be executed when the processor is in user mode. If the processor is presented with an impermissible instruction when the processor is in user mode, an exception would be generated, and the processor would switch to supervisor mode.

When a computer system boots, the processor is operating at supervisor level. Likewise, the processor operates at supervisor level when the operating system is in control of the processor. The operating system will at some point pass control of the computer system to a software program, such as application program, that can execute with a processor that is running in user mode. When this occurs, the operating system issues a command that causes the processor to switch from supervisor mode to user mode. There is not a similar command that the application program can issue to cause the processor to switch from user mode to supervisor mode. If the application program passes to the processor an impermissible instruction, i.e., an instruction that cannot be executed by the processor when the processor is in user mode, an exception will be generated, causing the operating system to gain control of the processor and causing the processor to switch to supervisor mode. If the application program does not perform an illegal operation, the application program can maintain control of the computer system indefinitely and the processor will continue to operate at user mode. A computer system will generally have a timer that will cause an interrupt to be generated at regular intervals, allowing the processor to switch to supervisor mode and allowing the operating system to regain control of the processor.

Because most application programs execute with a processor that is running in user mode, the functions that may be performed by the application program are somewhat limited. Software that operates in user mode cannot manipulate the computer system's settings and resources. User level software, for example, cannot write to certain privileged memory locations or take other actions that would compromise the stability or cause the malfunction of the computer system. If an application program were to attempt to perform such a function, an exception would be generated. When an exception is issued, the processor halts execution of the user level code and transitions to a supervisor level exception handler that was previously installed by the operating system. As another example, if an application program attempts to write to a page of a virtual memory system that has not yet been mapped into the page table maintained by the operating system, a page fault exception will occur. When the page fault occurs, control passes to the supervisor level code of the operating system, which maps in the virtual page requested by the user level code. After mapping in the page requested by the application program, the processor switches from supervisor mode to user mode, returning control to the application program.

In the DOS operating system environment, the processor always operated at supervisor mode. Thus, all application programs for DOS, as well as DOS itself, executed at the supervisor level. As a result, every piece of software for DOS, whether at an operating system level or an application program level, is written for a processor that will execute at supervisor mode. When an emulation program emulates the operation of a DOS operating system for an application program written for the DOS operating system, the use of code in the application program that is written for a processor executing at supervisor mode presents a difficulty in that the application programs include code that cannot be executed on a processor running at user level. Further, another difficulty of emulated DOS programs is that emulated DOS programs may attempt to establish their own set of exception handlers or perform other housekeeping functions, such as turning interrupts on and off. Because these DOS programs execute on a processor running at supervisor level, these programs are able to perform functions or modify settings of the computer system in a manner that is typically reserved for the operating system, creating a potential conflict for logical control of the computer system between the host operating system and the software running in an emulated DOS environment.

When emulating the operation of an operating system that was designed to operate with the processor of the host operating system, the emulator program is faced with the task of emulating code that is intended to run on a processor at supervisor level and code that is intended to run on a processor at user level. The emulated guest operating system may attempt to perform certain functions with code that is intended to operate at supervisor level that would either interfere with the operating system settings established by the host computer or reveal to the guest operating system that it is emulated and is not in actual control of the computer system. In this environment, where the host computer system and the guest computer system are both associated with the same processor or processor family, handling the software of the guest computer system can be problematic in that the guest computer system includes software code that runs at user level and software code that runs at supervisor level. Directly executing all of the code of the emulated computer system may allow the emulated computer system to compromise the integrity of the host operating system, and translating or buffering all of the code of the guest computer system will introduce an undesirable performance drag in the emulation of the guest computer system.

SUMMARY OF THE INVENTION

The present invention concerns and emulation technique for emulating the operation of guest computer system having application programs designed to run on the processor family of the host computer system. An emulator is provided that receives blocks of instructions from the guest application programs of the guest computer system. Each block of instructions is parsed to determine whether the instruction block includes supervisor level instructions. If the instruction block includes only user level instructions, the instruction block is passed directly to the processor of the host computer system for execution. If the instruction block includes supervisor level instructions, the instruction block cannot be passed directly to the processor of the host computer system for execution. Rather, a translated instruction block is made available for execution by the processor of the host computer system.

A cache is searched to determine whether a translation for the instruction block exists in the cache. If a translation for the instruction block is in the cache, the translated instruction block of the cache is passed to the processor of the host computer system for execution. If a translation for the untranslated instruction block is not in the cache, the instruction block is translated and the translated instruction block is placed in the cache. The translated instruction block is placed in the cache so that if the instruction block is received from the guest application program a second time, a translation of the instruction block may be retrieved from memory, relieving the necessity of translating the instruction block upon each occurrence of the instruction block.

An advantage of the present invention is an emulation technique having particular application for emulated computing environments having software designed to execute on the processor of the host computer system. Because the emulated computing environment will include software instructions that can be executed on the processor of the host computer system, the emulator determines from the instructions issued by the emulated computing environment those instructions that can be passed directly to the processor and those instructions that must be translated before being passed to the processor. In this manner, the operation of the emulated computing environment is more efficient, as those instructions that can be handled by the processor without harming the integrity of the computer system are provided to the processor without the delay of dynamic translation. Other advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

The present invention provides an emulation environment for the emulation of a guest computer system that is associated with or designed to run on the same processor family as the host computer system. The emulation method of the present invention passes a portion of the software instructions of the guest computer system directly to the processor of the computer system for direct execution and dynamically translates a portion of the software instructions of the guest computer system to prevent the code of the guest computer system that was designed to run at supervisor level from compromising the operation of the computer system.

Figure 1:
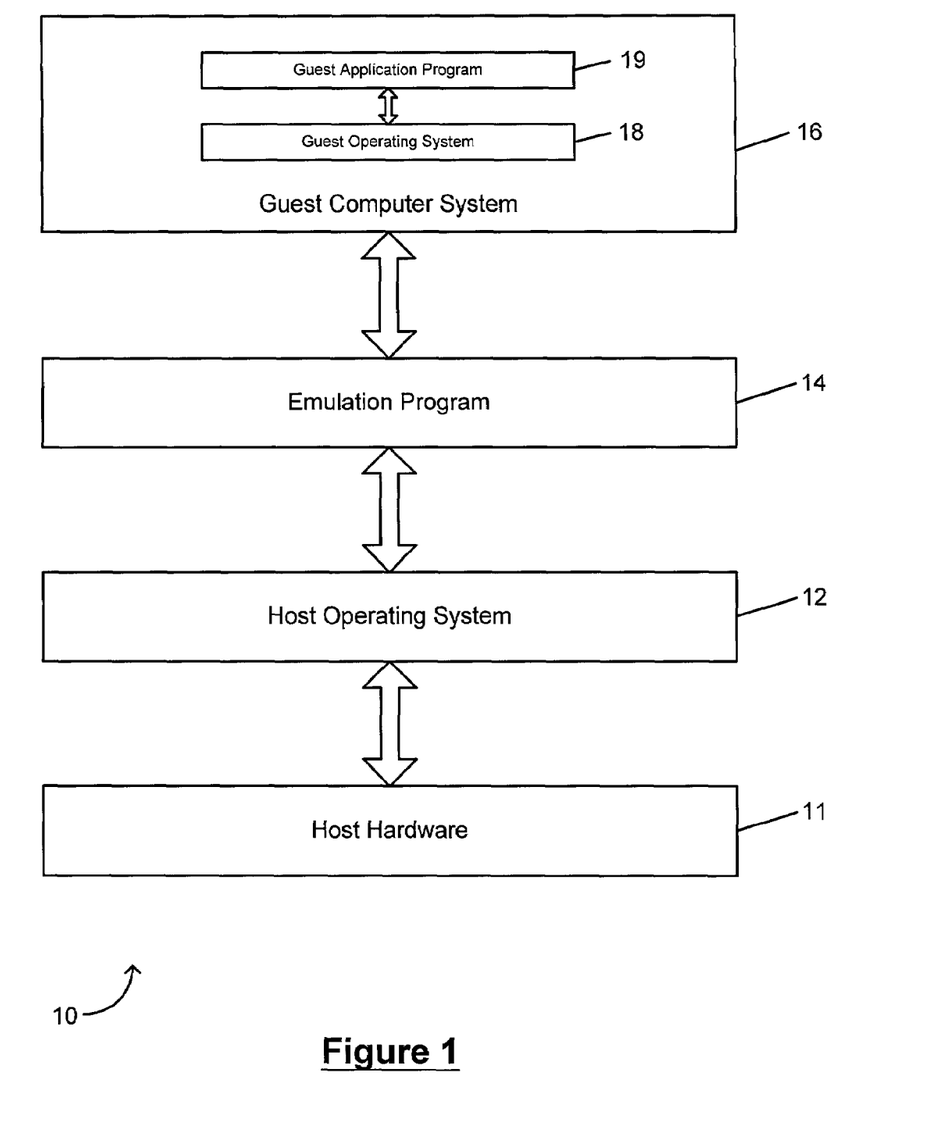
FIG. 1 is a diagram of the logical relationship of the elements of an emulated computer system running in a host computer system.

Shown in FIG. 1 is a diagram of the logical layers of the hardware and software architecture for an emulated operating environment in a computer system 10. An emulation program 14 runs as an application on a host operating system 12. Instructions are executed on the host computer system hardware or processor 11. Emulation program 14 emulates a guest computer system 16, including a guest operating system 18. Guest application programs 19 are able to execute on guest operating system 18. In the emulated operating environment of FIG. 1, guest operating system 18 is associated with the same processor family as host operating system 12. As such, the diagram of FIG. 1 is especially applicable when a legacy computer system must be emulated on a host computer system so that a set of older application programs, which were designed for the guest operating system, can run on the processor of the host operating system. Thus, despite the fact that host operating system 12 and guest application 19 are not compatible, guest application 19 can nevertheless execute on computer system 10.

As an example, the operating system of the host computer system may be Windows 98, and the guest operating system of the emulated computer system may be Windows 95, Windows 3.1, or DOS. The emulation program emulates the operation of the guest operating system, allowing application programs written specifically for the guest operating system to execute on the host computer system. As such, if an application program is not forward-compatible and can only be executed if run on a legacy operating system, the application program can run even though the legacy application program is not compatible with the host operating system of the computer system.

Figure 2:
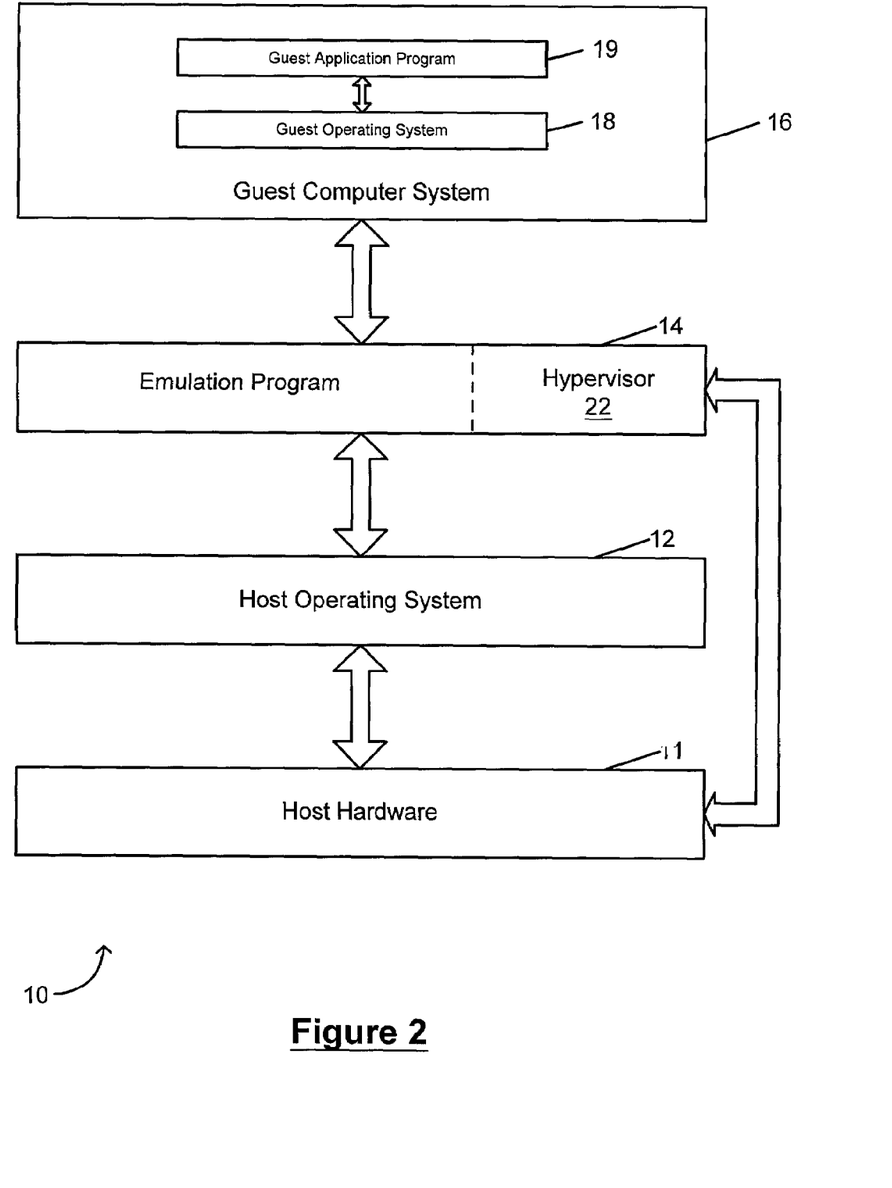
FIG. 2 is a diagram of the logical relationship of the elements of an emulated computer system in which a hypervisor is logically coupled to the processor of the computer system.

The software code of emulation program 14 frequently executes at both user level and at supervisor level. The software of the emulation program, as an application program running on the host operating system, executes on the processor of the computer system as user level code. When the emulation program is actually performing the step of emulating a computer system, however, the software of the emulation program executes at supervisor level. To switch from user level code to supervisor level code, the emulation program must logically decouple the host operating system from the processor and assume for itself logical control over the processor of the computer system. To logically decouple the host operating system from the processor of the computer system, emulation program 14 reads in the contents of the processor registers and saves these contents, i.e., the processor state, to memory. Emulation program 14 next replaces the processor state of the host processor with the processor state of the hypervisor, resulting in the logical coupling of the hypervisor of the emulation program to the processor of the computer system. As a result, the hypervisor of the emulation program, and by association the guest operating system, have logical control over the host hardware.

A logical diagram of this relationship, including an identification of the hypervisor 22 of the emulation program is shown in FIG. 2. The hypervisor of the emulation program is the module of the emulation program that performs the steps of logically decoupling the host operating system and logically coupling the emulation program to the host hardware and process. The logical decoupling of a host operating system from the processor of the computer system and the logical coupling of a guest operating system to the processor of the computer system is described in U.S. application Ser. No. 09/747,492, "System and Method for the Logical Substitution of Processor Control in an Emulated Computing Environment," which was filed on Dec. 21, 2000, and which is incorporated herein by reference. To recouple the host operating system to the processor, the emulation program reads in from memory and writes to the appropriate registers of the processor the processor settings that had been saved to a memory location during the period that the emulation program was in logical control over at least some of the functions of the processor of the computer system.

Figure 3:
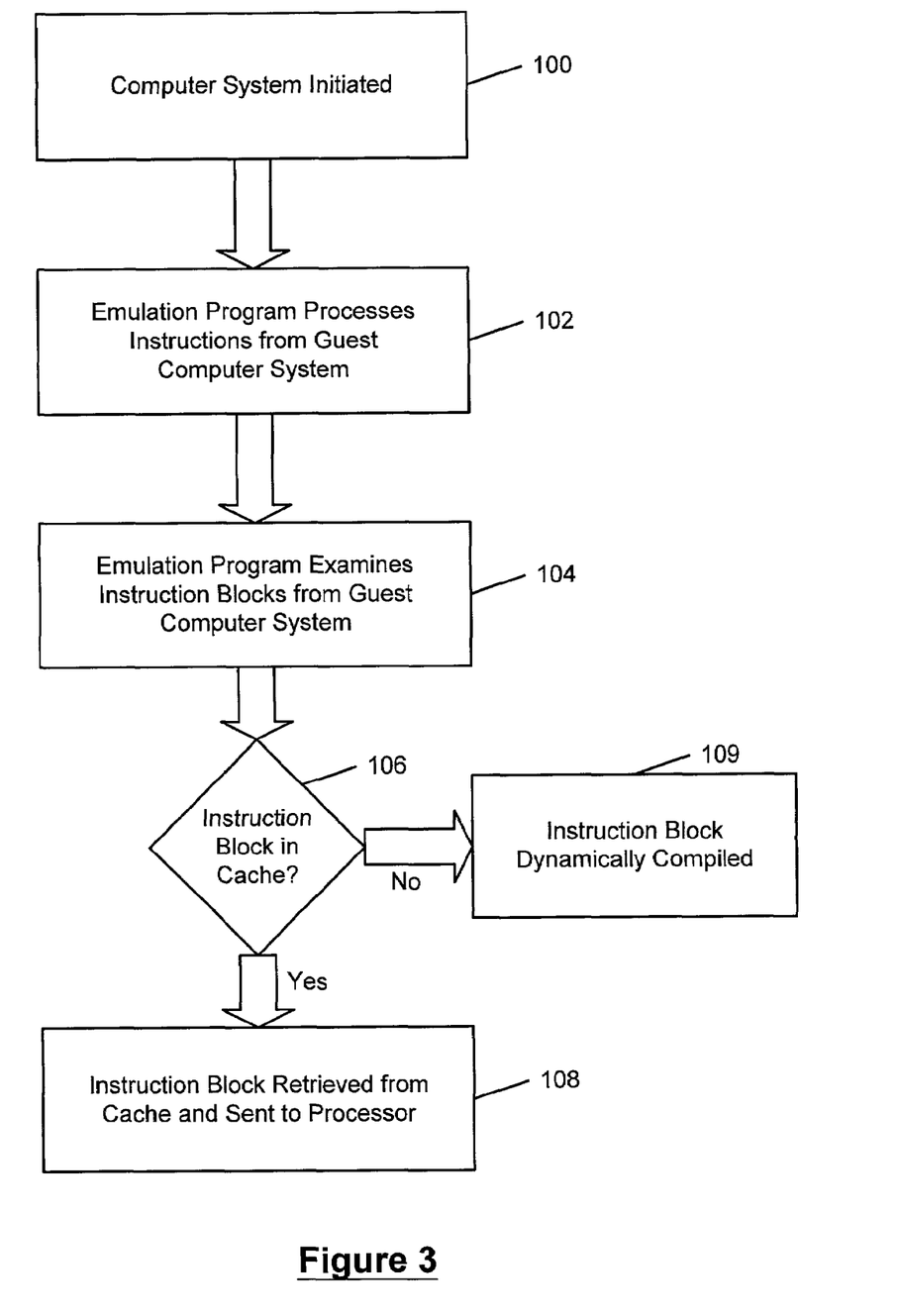
FIG. 3 is a flow diagram of a method for handling software instructions from a guest operating system that are intended to run on a processor at either supervisor level or user level.

Shown in FIG. 3 is a flow diagram of the method for handling in an emulation program code from a guest operating system that is intended to run on a processor at either supervisor level or user level. The emulation program must handle all instructions received from the guest computer system, whether those instructions are meant to execute as supervisor level code or as user level code. When the guest computer system is first initiated at step 100, the guest computer system believes that it is in logical control of a processor that is operating at supervisor level. Because the guest computer system believes that it is executing instructions at supervisor level, the emulation program likewise switches to supervisor mode. While in supervisor mode, at step 102, the emulation program processes supervisor-level instructions issued by the guest computer system according to the following sequence. The emulation program includes a dispatch routine that examines at step 104 each block of instructions issued from the guest computer system. At step 106, the dispatch routine determines if the block of instructions received at the dispatch routine has been examined and placed in cache memory. If a cached set of examined and compiled instructions exists in cache memory, the cached instructions are retrieved from cache memory at step 108 and transmitted to the processor for execution. If the dispatcher determines at step 106 that the received block of instructions have not been examined, compiled, and the result saved to the cache, the guest instructions must be examined and dynamically compiled by the emulation program at step 109.

Figure 4:
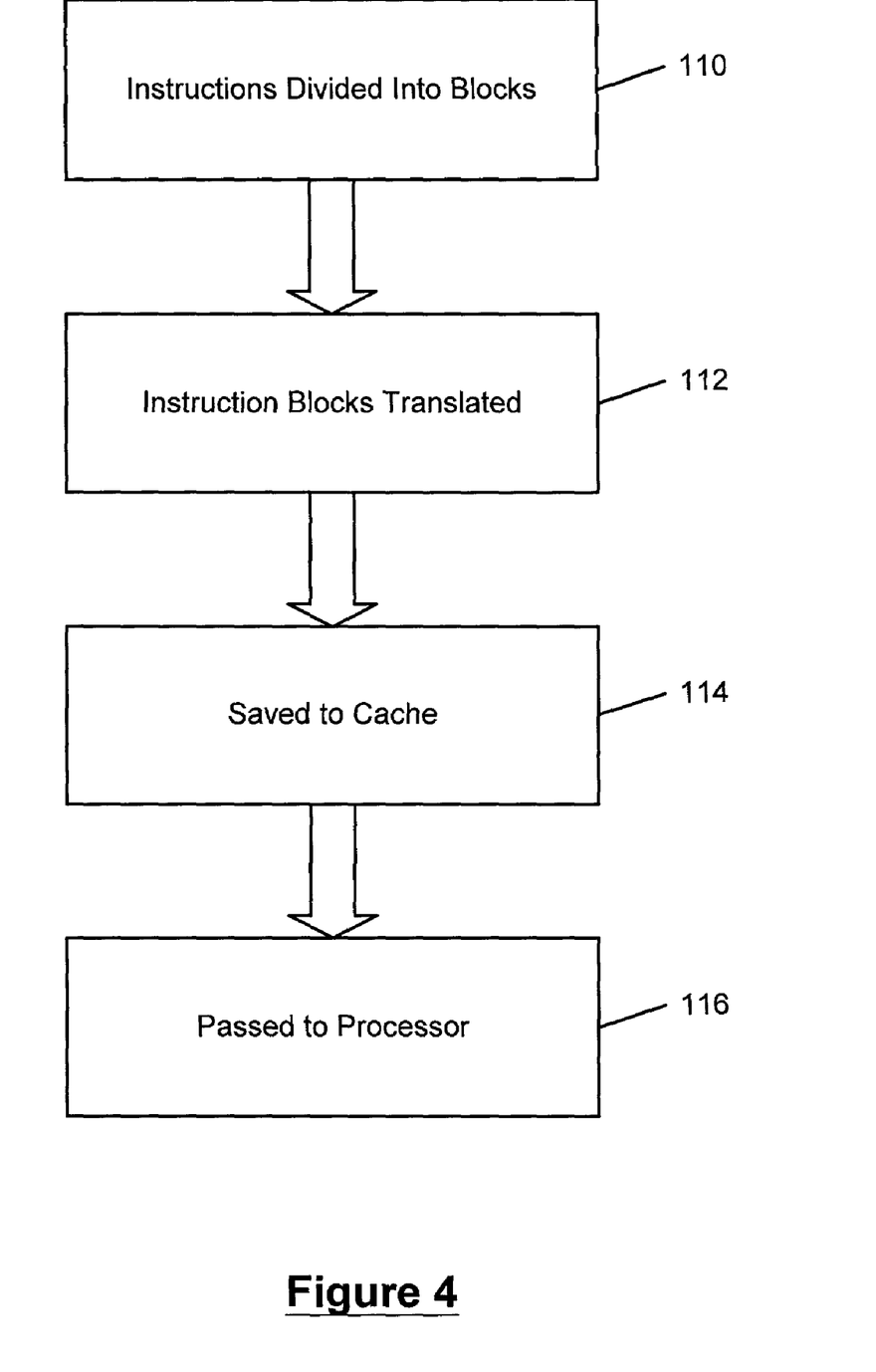
FIG. 4 is a flow diagram of the method for dynamically compiling supervisor level instructions issued by the guest computer system.

Shown in FIG. 4 is a flow diagram of the method for dynamically compiling supervisor level instructions issued by the guest computer system. Beginning from the current guest instruction, the emulation program at step 110 divides the instructions into manageable blocks of instructions. Following the identification of a block of instructions, the instruction block is dynamically translated at step 112. The translated block of instructions is saved to a cache of translated blocks of instructions at step 114, and the translated instruction is provided to the processor of the host computer system for execution at step 116.

The dynamic translation step of step 112 occurs even if the instruction block includes no instructions that are potentially disruptive, i.e., the instruction block includes only benign instructions that are unlikely to affect the operation or integrity of the host computer system. In the case of a benign instruction block that is dynamically translated at step 112, it is likely that the translated instruction block will be similar to, if not the same as, the untranslated instruction block. In the case of the translation of a benign instruction, the result of the translation step in many cases is similar to a copy function in which the translated instruction is the same as the untranslated instruction. Examples of supervisor level instructions that must be dynamically translated by the emulation program are (a) instructions that call for the installation of an exception handler that is incompatible with an exception handler of the host operating system; (b) an instruction (as in the case of DOS or DOS application programs) to turn off the issuance of interrupts; or (c) any instruction that would cause or allow the emulated operating system to query a system structure or setting that would reveal to the emulated operating system that it is not in exclusive logical control of the computer system.

As an example of the dynamic translation of potentially disruptive instructions from the guest computer system, the emulated operating system or a legacy application program may attempt to turn off a certain system interrupt, such as an interrupt relating to the handling of keystrokes detected by the computer system's peripheral controller. Although the disabling of this certain system interrupt may be permissible in the emulated operating system, it is assumed for the sake of this example that the disabling of this interrupt is not permitted by the host operating system. The emulation program will dynamically translate this instruction by buffering all supervisor level instructions issued by the emulated operating system or a legacy application program running on the emulated operating system, identifying the instruction as an instruction that is not permitted by the host operating system and may compromise the operational integrity of the computer system. The process of dynamically translating the supervisor level code involves determining a substitute instruction or set of substitute instructions that will replace the translated instruction. In this example, rather than pass the interrupt-cancel instruction to the processor, the emulation program will instead pass a substitute instruction that sets a flag in the emulated program that indicates that the emulated operating system does not want to participate in the resolution of interrupts related to keystrokes detected by the computer system's peripheral controller.

As a second example of the translation of potentially disruptive instructions, if the emulated operating system later queries the status of the cancelled interrupt, the emulated operating system should receive a response that the interrupt-cancel instruction remains in effect. A request of this sort from the emulated computer system must be translated by the emulation program so that the emulated operating system receives a response indicating that the interrupt-cancel instruction is in effect. If the supervisor level instruction from the emulated computer system is not translated by the emulation program, the processor will return a response indicating that the interrupt-cancel instruction is not in effect, thereby demonstrating to the emulated operating system that its prior instructions were not executed and that it does not have logical control over the computer system. To maintain the integrity of the emulation and of the entire computer system, the emulated operating system must believe and function as though it has exclusive logical control over the functions of the computer system. For each supervisor level instruction block that must be translated, the translated instruction block is cached. In the event that the same supervisor level instruction block is again received by the emulation program, the cached substituted instruction block can be retrieved, eliminating the requirement of determining the substituted instruction.

Once an instruction block has been translated, the translated instruction block is passed to cache memory, and the translated instruction block is provided to the processor of the host computer system for execution. Because the translated instruction block is now in the cache, whether the instruction block includes potentially disruptive instructions or includes only benign instructions, the handling of the instruction block can be simplified when it is next received at the dispatcher.

Figure 5:
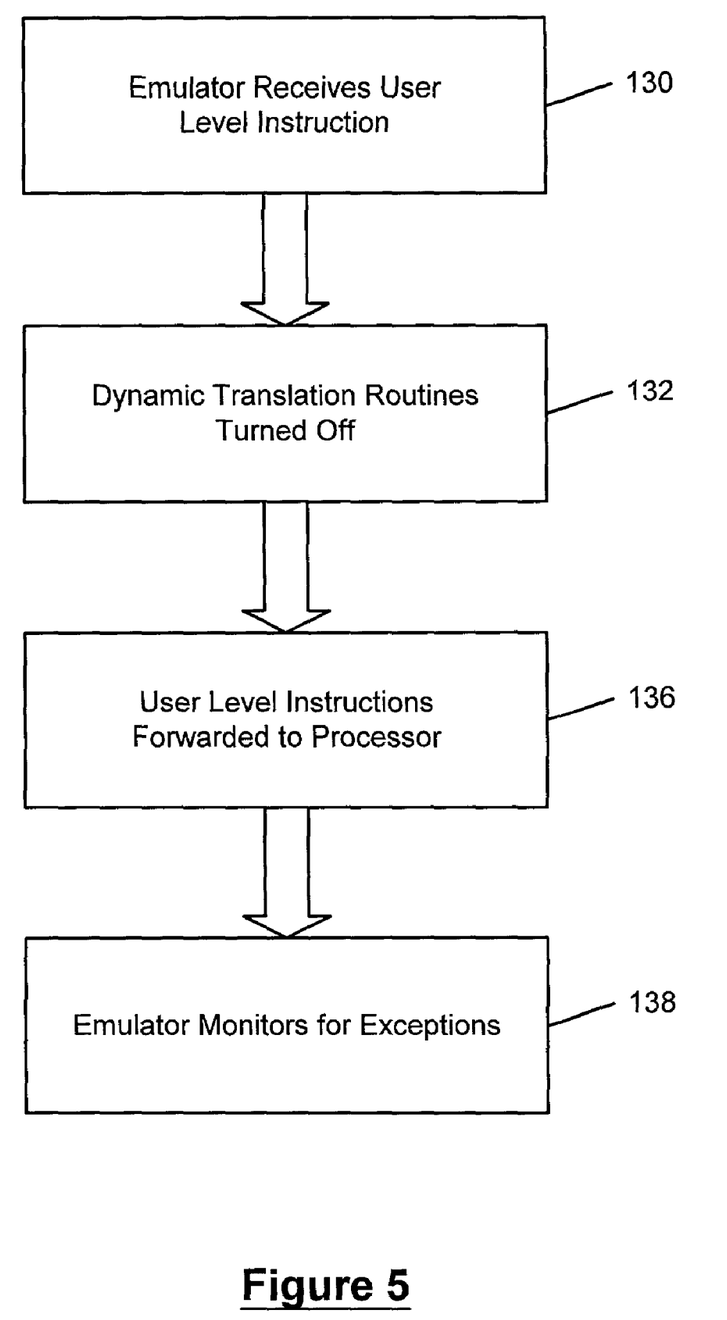
FIG. 5 is a flow diagram of the method steps for handling user level instructions issued by the guest computer system.

FIG. 5 is a flow diagram of the method steps for handling user level instructions issued by the guest computer system. When the emulation program receives at step 130 an instruction from the guest computer system that would, in normal operation, cause the processor to transition from supervisor mode to user mode, the emulation program turns off its dynamic translation routines at step 132 and enters a direct execution pass-through mode for user level instructions. At step 136, the user level instructions pass directly to the host processor for execution. Once the host processor begins receiving a string of user level instructions for execution, these instructions are passed directly to the host processor outside of the control of the direct involvement of the emulation program. The direct pass-through of user level instructions to the host processor continues until the issuance of an exception, such as an interrupt. The emulation program at step 138 monitors the host processor for the issuance of an exception that would cause the processor to switch from user mode to supervisor mode.

Figure 6:
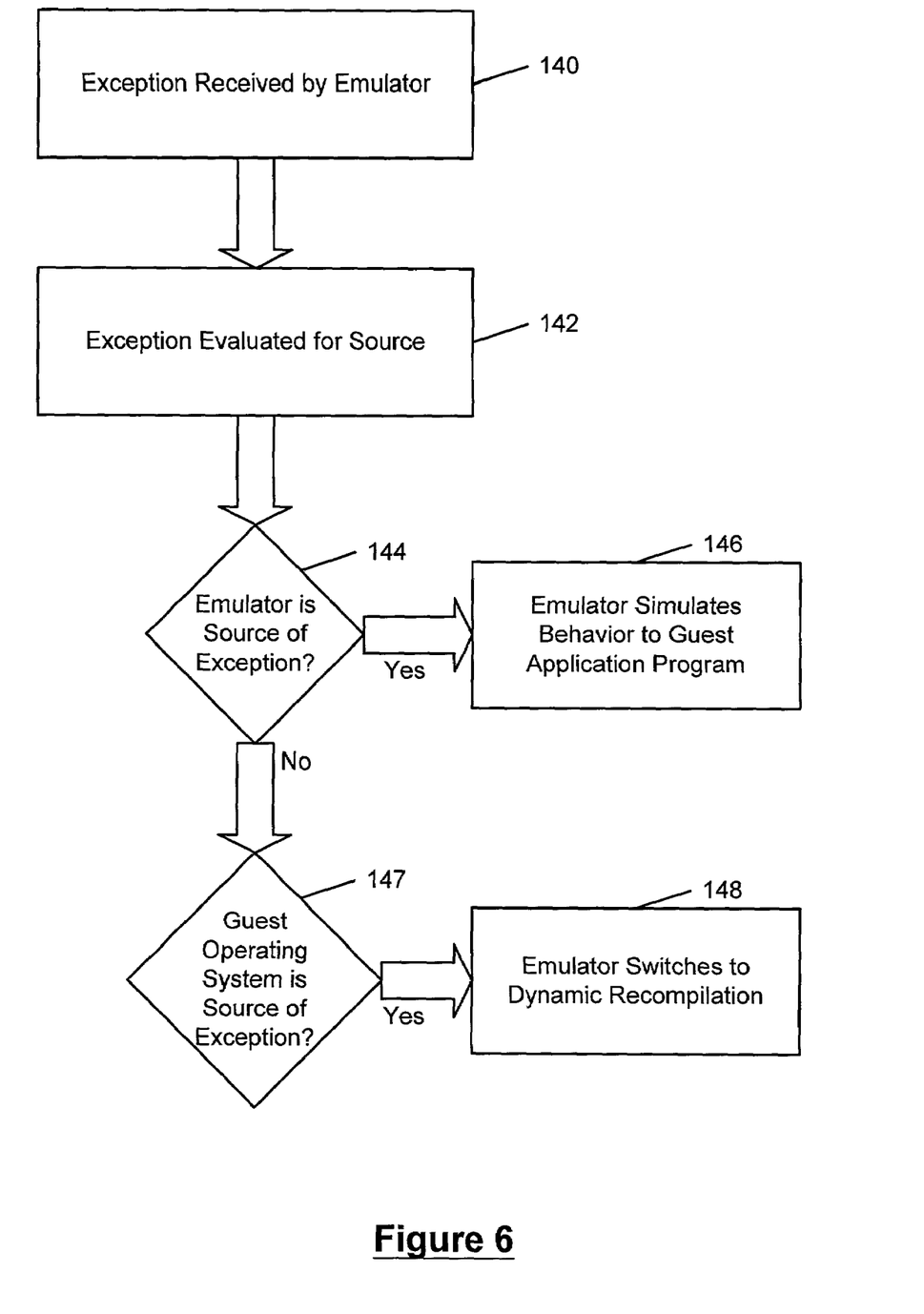
FIG. 6 is a flow diagram of the method steps for handling exceptions received by the emulation program.

Once user level instructions have begun to issue from the guest computer system, the emulation program continues to pass the user level instruction to the host processor for execution. The emulation program will continue to pass user level instructions until an exception occurs, such as when an interrupt is generated. With reference to FIG. 6, when an exception is received by the emulation program at step 140, the exception is evaluated at step 142 to determine the source of the exception. If it is determined at step 144 that the source of the exception is the result of efforts by the emulation program to protect the integrity of the host operating system from the operation of the guest operating system, the emulation program at step 146 must simulate the behavior that the guest application program is expecting, notwithstanding that the guest application program issued an instruction or a set of instruction that would cause an exception to occur in the host computer system. If it is determined at step 147 that the source of the exception is an attempt by the guest processor to protect itself, the exception must be simulated to the guest operating system. To simulate the operation of the exception to the guest operating system, the emulation program switches at step 148 back to a dynamic recompilation mode in order to dynamically recompile supervisor level instructions received from the guest operating system.

Figure 7:
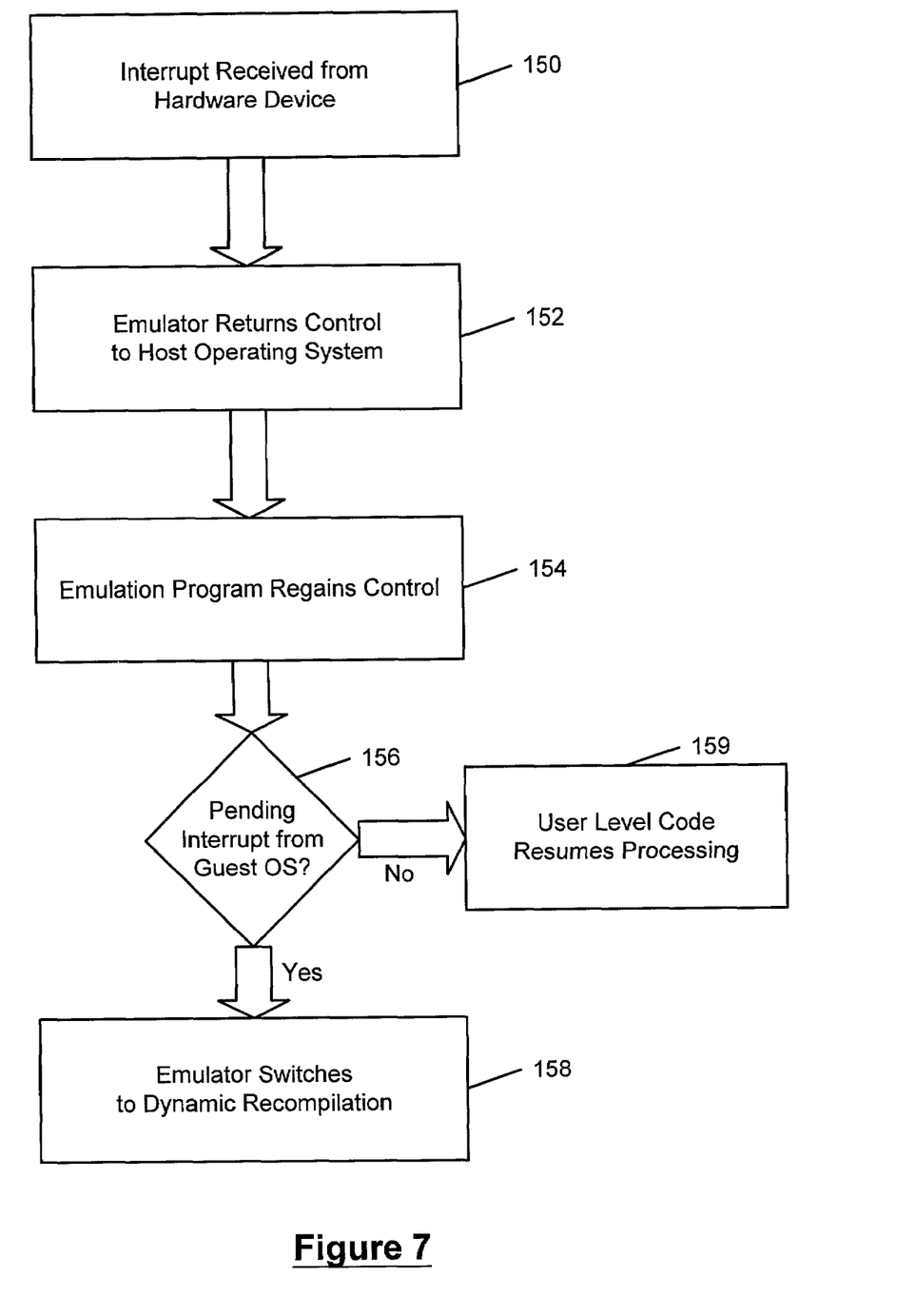
FIG. 7 is a is a flow diagram of the steps for handling an exception received from a hardware device.

In addition to handling exceptions generated within the user-level code, the emulation program must also handle other exceptions, such as interrupts, issued by hardware devices of the computer system. Shown in FIG. 7 is a flow diagram of the steps for handling an interrupt received from a hardware device. Once an interrupt is received from a hardware device at step 150, the emulation program at step 152 returns control to the host operating system to allow the host operating system to process the interrupt. After the host operating system has processed the interrupt, control is returned to the emulation program at step 154. The emulation program next determines at step 156 if there is an interrupt that has been issued by the guest operating system that is pending. If there are no interrupts pending from the guest operating system, at step 159 control is returned to the user level code that was being issued and processed by the guest operating system at the time the interrupt occurred. If an interrupt is pending from the guest operating system, the emulation program must simulate the handling of an interrupt by the guest computer system. To do so, the emulation program returns at step 158 to supervisor mode and dynamically recompiles the supervisor level instructions associated with the interrupt of the guest computer system.

Thus, the emulation program switches between a direction execution mode for passing user level code directly to the processor and a dynamic translation mode for translating supervisor level code. Code that can be directly executed is passed directly to the processor, and code that cannot be directly executed, i.e., supervisor level code, must be in some cases translated by the emulation program before being executed by the processor. According to the method of the present invention, both types of software instructions that may be issued by the emulated operating system and the guest applications can be handled by the emulation program without either compromising the integrity of the host computer system or degrading the emulated performance of the emulated computer system.

The disclosed emulation method permits the emulation of multiple computer systems that are each compatible with the processor of the host computer system. The emulation program provides an emulation environment in which each emulated environment transmits instructions for execution to the processor as if the emulated operating system is in exclusive logical control over the computer system. The emulation program accommodates both supervisor level code and user level code from the emulated computer system. The emulation program distinguishes among the supervisor level code and the user level code, transmitting the user level code directly to the processor for execution and dynamically translating the supervisor level code to prevent the execution of supervisor level code that would harm the integrity of the computer system and preserves the appearance to the emulated operating system that it is in exclusive logical control over the computer system.

The present invention is applicable in those instances in which the operating systems and application programs of the host operating system and the operating systems and application programs of the guest operating system are designed to run on the same processor family. In addition to allowing backward compatibility between computing environments, such as when a user runs an legacy application program on a current computer system having a current operating system, the present invention allows for emulation among computing environments that are forward compatible. An example of forward compatibility occurs when a user runs in an emulated environment an application program written for a more recent operating system. In this example, the host computer system includes an older version of the same operating system. As a more specific example, the user could run in an emulated environment a version an application program written for Windows 2000, while the emulation program runs as an application program on a computer system that runs Windows 98 as its primary operating system.

Although the present invention has been described in detail, it should be understood that various changes, substitutions, and alterations can be made thereto without departing from the spirit and scope of the invention as defined by the appended claims.

What is claimed is:

1. A method for emulating on a computer system the operation of a guest computer system, comprising the steps of:

providing an emulation program that runs as an application on the operating system of the host computer system, the emulation program emulating for at least one guest application program the operation of a guest operating system;

receiving at the emulation program blocks of software instructions from the guest application program; and determining, for each block of instructions, whether (a) the block of instructions includes user level instructions, in which case the instructions are passed to the processor of the computer system for execution, or (b) the block of instructions include supervisor level instructions, in which case the block of instructions is translated and the translated block of instructions is passed to the processor of the computer system for execution.

2. The method for emulating the operating of a guest computer system on a host computer system of claim 1, wherein the step of translating supervisor level instructions comprises the step of dynamically translating a block of instructions that include at least one supervisor level instruction.

3. The method for emulating the operating of a guest computer system on a host computer system of claim 1, further comprising the step of saving to a cache the translated instruction.

4. The method for emulating the operating of a guest computer system on a host computer system of claim 3, further comprising the step of evaluating for each block of supervisor level instructions to be translated, whether a translation for the instruction block resides in cache memory.

5. The method for emulating the operating of a guest computer system on a host computer system of claim 4, further comprising the step of retrieving a translated instruction block from cache memory when it is determined, following an evaluation of cache memory, that a translated instruction block associated with an untranslated block of supervisor level instructions resides in cache memory.

6. The method for emulating the operating of a guest computer system on a host computer system of claim 5, wherein the step of translating an untranslated block of supervisor level instructions is performed only if translated instruction block associated with the untranslated block of supervisor level instructions does not reside in cache memory.

7. The method for emulating the operation of a guest computer system on a host computer system of claim 6, further comprising the step of passing a series of user level instructions to the processor of the computer system and monitoring the computer system for an exception to indicate a transition from user level instructions to supervisor level instructions.

8. The method for emulating the operating of a guest computer system on a host computer system of claim 1, wherein the guest operating system is designed to run on the processor of the computer system.

9. The method for emulating the operating of a guest computer system on a host computer system of claim 1, wherein the guest operating system is a more recent version of the host operating system.

10. A method for emulating on a host computer system the operation of a guest computer system, wherein the application programs of the host computer system and the application programs of the guest computer system can execute on the processor of the host computer system, comprising the steps of:

providing an emulation program that emulates the operation of a guest operating system;

receiving at the emulation program software instructions from a guest application program;

parsing the instructions into blocks of instructions; and determining for each block of instructions whether the block includes supervisor level instructions, wherein each block of instructions that does not include a supervisor level instruction is passed to the processor of the host computer system, and wherein each block of instructions that includes a supervisor level instruction undergoes a translation step before being passed to the processor for execution.

11. The method for emulating on a host computer system the operation of a guest computer system of claim 10, wherein the step of passing each block of instructions that do not include a supervisor level instruction to the processor of the host computer system comprises the step of passing user level instructions to the host processor.

12. The method for emulating on a host computer system the operation of a guest computer system of claim 11, wherein the step of passing user level instructions to the host processor comprises the step of passing user level instructions from a guest application program to the host processor without translation of the instructions.

13. The method for emulating on a host computer system the operation of a guest computer system of claim 12, further comprising the step of saving to a cache each translated instruction.

14. The method for emulating on a host computer system the operation of a guest computer system of claim 13, further comprising the step of evaluating for each block of instructions that includes a supervisor level instruction to be translated, whether a translation for the block of instructions resides in the cache.

15. The method for emulating on a host computer system the operation of a guest computer system of claim 14, further comprising the steps of:

if a translation for a selected block of instructions is in the cache, passing the translated block of instructions to the processor of the host computer system for execution; and if a translation for a selected block of instructions is not in the cache, translating the selected block of instructions and passing the translated block of instructions to the processor of the host computer system for execution.

16. The method for emulating on a host computer system the operation of a guest computer system of claim 10, wherein the guest operating system is a more recent version of the operating system of the host computer system.

17. A method for emulating on a host computer system the operation of a guest computer system, the guest computer system including guest application program designed to executed on the processor of the host computer system, comprising the steps of:

provicing an emulation program that runs as an application on the operating system of the host computer system, the emulation program emulating for at least one guest application program the operation of a guest operating system;

receiving at the emulation program blocks of instructions from a selected guest application program;

parsing each block of instruction to determine whether each block of instructions includes supervisor level instructions;

for those blocks of instructions that do not include supervisor level instructions, passing the block of instructions to the processor of the host computer system for execution; and for those blocks of instructions that include supervisor level instructions, translating the block of instructions before passing the translated block of instructions to the processor of the host computer system for execution.

18. The method for emulating on a host computer system the operation of a guest computer system of claim 17, further comprising the step of determining, for each block of instructions that include supervisor level instructions, whether a translation for the block of supervisor level instructions exists in cache memory, and for each translated block of supervisor level instructions that exists in cache memory, passing the translated block of supervisor level instructions to the processor of the host computer system for execution.

19. The method for emulating on a host computer system the operation of a guest computer system of claim 18, further comprising the step of saving to cache memory each translated block of supervisor level instructions.

20. The method for emulating on a host computer system the operation of a guest computer system of claim 17, wherein the guest operating system is a more recent version of the host operating system.

* * * * *

UNITED STATES PATENT AND TRADEMARK OFFICE
CERTIFICATE OF CORRECTION

PATENT NO. : 6,980,946 B2
APPLICATION NO. : 09/809731
DATED : December 27, 2005
INVENTOR(S) : Aaron Giles et al.

It is certified that error appears in the above-identified patent and that said Letters Patent is hereby corrected as shown below:

On page 2, item (56), under "Other Publications", in column 1, line 10, delete "32_  BIT/POWERPC" and insert -- 32_BIT/POWERPC --, therefor.

On page 2, item (56), under "Other Publications", in column 1, line 12, delete "Applicatio" and insert -- Application --, therefor.

In column 6, line 5, delete "is a" before "flow diagram". (second occurrence)

In column 13, line 2, in Claim 17, insert -- be --, before "executed".

Signed and Sealed this

First Day of September, 2009

David J. Kappos
*Director of the United States Patent and Trademark Office*